J. LAUS, Jr.
PNEUMATIC WHEEL.
APPLICATION FILED DEC. 1, 1913.
1,118,786.
Patented Nov. 24, 1914.
2 SHEETS—SHEET 2.
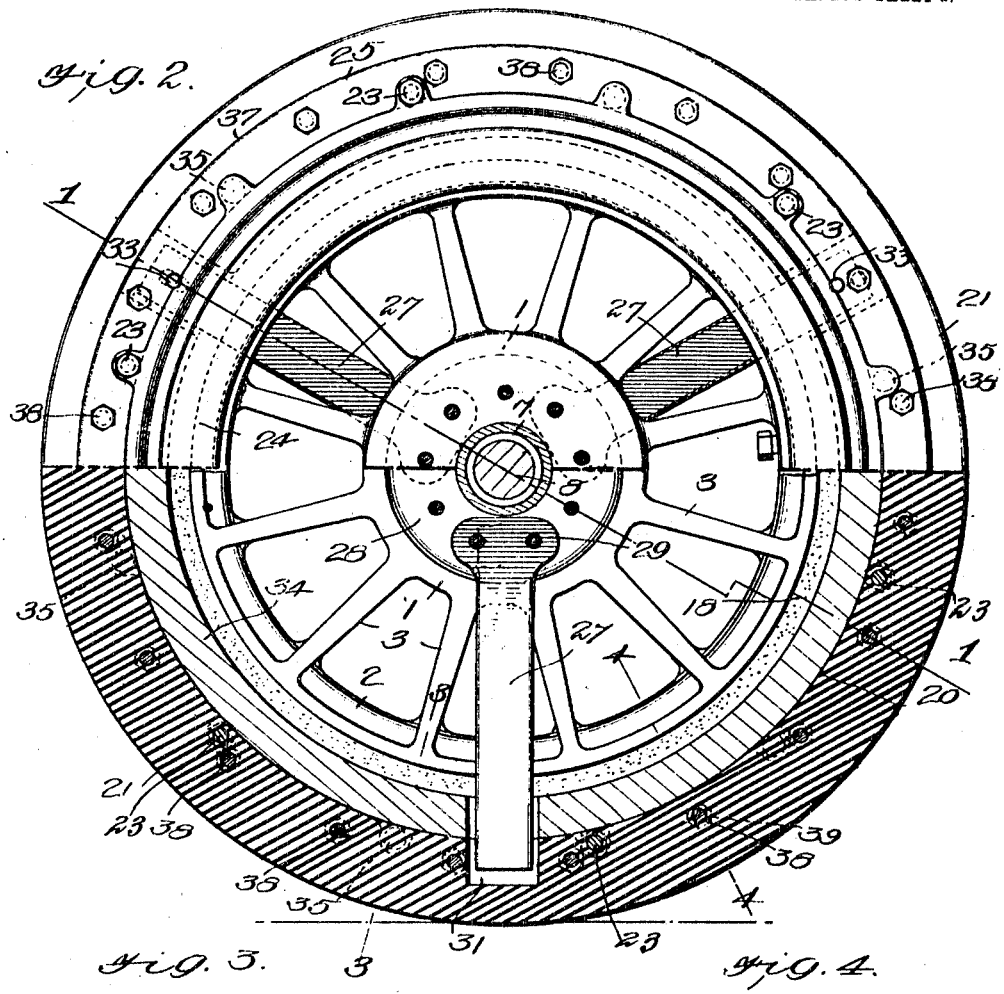
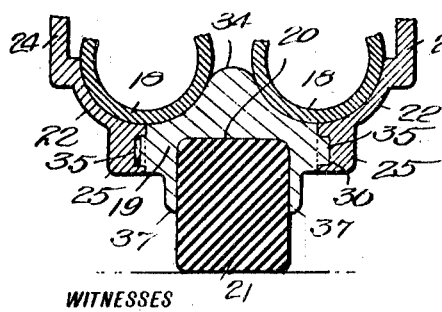
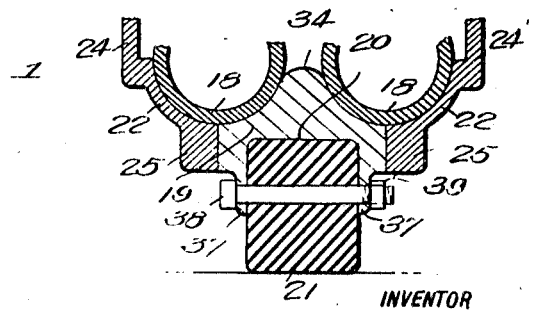
WITNESSES
H E Barry
C. E. Trainor
INVENTOR
Joseph Laus Jr.
BY Munn Co.
ATTORNEYS

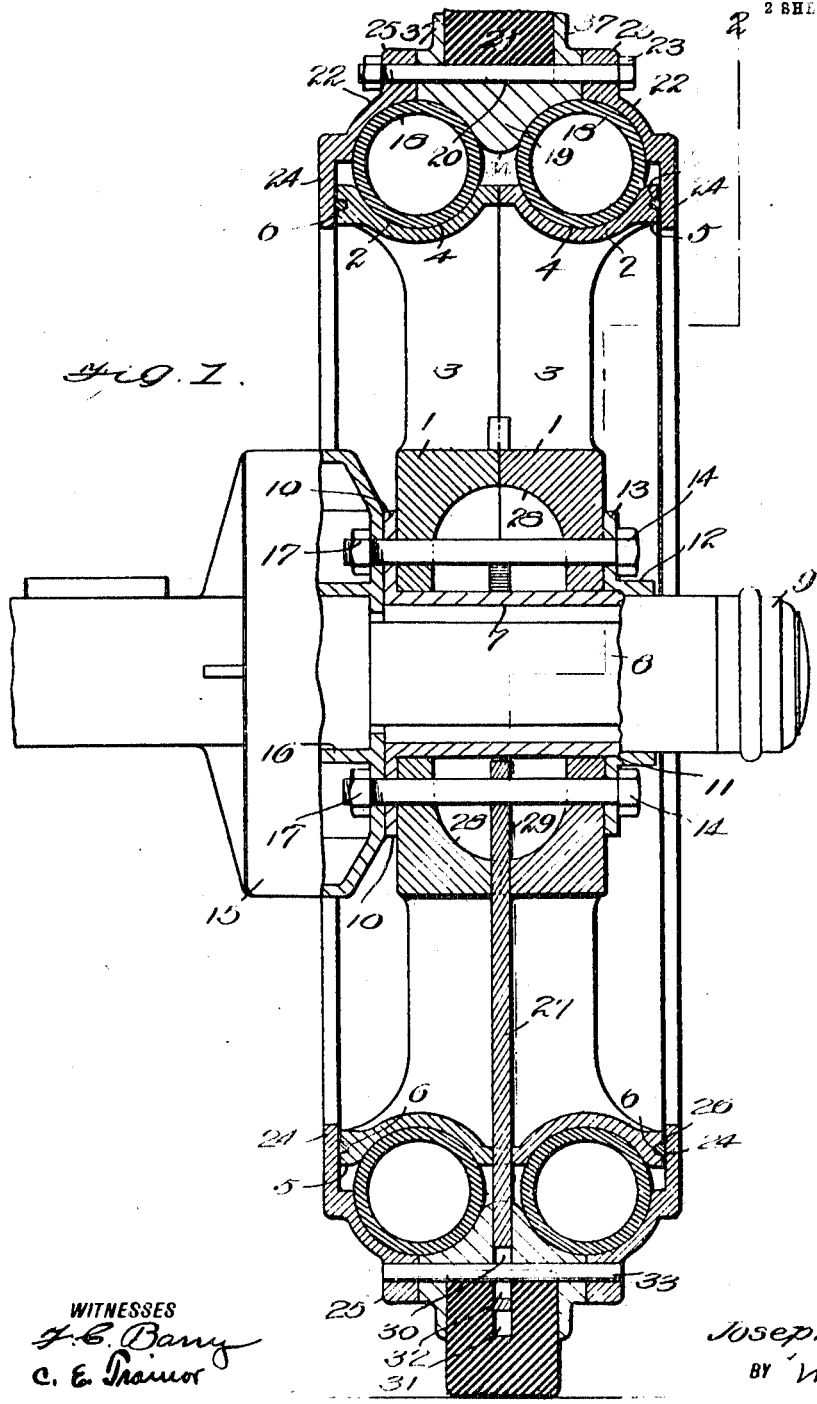

UNITED STATES PATENT OFFICE.

JOSEPH LAUS, JR., OF OSHKOSH, WISCONSIN.

PNEUMATIC WHEEL.

1,118,786.　　　　　Specification of Letters Patent.　　　Patented Nov. 24, 1914.

Application filed December 1, 1913. Serial No. 803,935.

*To all whom it may concern:*

Be it known that I, JOSEPH LAUS, Jr., a citizen of the United States, and a resident of Oshkosh, in the county of Winnebago and State of Wisconsin, have invented a new and useful Improvement in Pneumatic Wheels, of which the following is a specification.

My invention is an improvement in pneumatic wheels, and has for its object to provide a wheel of the character specified, having pneumatic tires so arranged that all of the resiliency of the tires may be utilized, while at the same time, the tires are perfectly protected from injury, and from the actual wear due to contact with the road surface.

In the drawings:—Figures 1, 3 and 4 are sections on the lines 1—1, 3—3, and 4—4, respectively of Fig. 2, and Fig. 2 is a section on the line 2—2 of Fig. 1.

The present embodiment of the invention comprises an inner wheel and a tread member, the inner wheel being sectional and divided at the center of the plane of the wheel. Each section of the inner wheel consists of a hub 1, a rim 2, and spokes 3, connecting the rim to the hub.

Each rim is annularly grooved on its outer face as shown at 4, and each rim is extended at its outer side beyond the adjacent face of the outer wheel as shown at 5, and the outer face of each extension is annularly grooved as shown at 6.

A bushing or sleeve 7 is arranged within the hub for receiving the spindle 8 of the axle, and the bushing is provided with the usual dust cap 9, at its outer end and with an annular marginal lateral flange 10, at its inner end. The bushing is reduced intermediate its ends as indicated at 11, and a collar 12 encircles the bushing at this point, the interior of the collar being shaped to fit both the body and the reduced portion of the bushing.

The said collar is provided with an inner marginal laterally extending flange at its inner end, the said flange being parallel with the flange 10, and the two flanges fit on opposite faces of the hub as shown in Fig. 1. Bolts 14 are passed through the sections of the hub, and through the flanges from without inwardly, and each of the bolts passes through one wall of a housing 15 arranged at the inner side of the wheel and abutting against the flange 10 of the bushing.

The said housing has an inner bearing 16, which encircles the body of the axle as shown, and each bolt is engaged by a nut 17 within the housing to clamp the flanges 10 and 13 and said housing on the hub.

Pneumatic tires 18 are arranged within the grooves 4 of the rim sections, and the outer wheel engages the outer surfaces of the said tires. The tread member is also sectional comprising a rim 19, having an external annular groove 20 for receiving a solid rubber tire 21, and retaining or housing rings 22, arranged on opposite sides of the rim and secured thereto by means of bolts and nuts 23.

The inner surfaces of the rim 19 and the housing rings 22 are shaped to fit the outer surfaces of the pneumatic tires, and each ring has an inwardly extending web or flange 24, and an outwardly extending rib 25, each rib abutting against the adjacent face of the rim 19. The bolts 23 pass through the ribs 25 and through the rim to clamp the housing rings to the rim 19.

The webs 24 of the housing rings extend inwardly alongside the extensions 5 before mentioned, and packing rings 26 are arranged within the grooves 6 of the said extensions, the packing rings abutting against the inner faces of the webs 24. The tread member is prevented from lateral movement with respect to the inner wheel by means of a radial arm 27, which connects the hub of the inner wheel with the rim of the tread member. Ordinarily, when both tires are inflated, but a single driving arm is used. Three arms are however, provided, in order to provide a solid wheel construction in case of puncture or injury to the pneumatic tire. Two of the driving arms are normally disconnected at their outer ends, or they may be removed entirely if desired and applied only in case of puncture or injury as above stated.

The arms 27 are three in number, and the said arms are arranged between the sections of the inner wheel. Each arm has its inner end received between the sections of the hub, the said sections being recessed on their abutting faces and at their inner surfaces as indicated at 28, and the inner ends of the arms are enlarged laterally as shown at 29 in Fig. 2 and are received in the recesses 28.

The bolts 14 before mentioned, pass through openings in the laterally enlarged portions of the arms, to rigidly connect the said arms to the inner wheel. The arms extend through openings between the rim sections, and into registering recesses 30 and 31 in the rim 19 and the tire 21 before mentioned.

Each arm is longitudinally slotted as shown at 32 at its outer end, and pins 33 are passed through registering openings in the ribs 25 of the housing rings and in the rim 19 and through the slots 32 of the arms 27. Ordinarily but one of the pins 33 is inserted, the other two arms being free at their outer ends. Thus the inner wheel may move radially with respect to the tread member without interference on the part of the said arms.

The rim 19 is preferably of a special aluminum alloy casting while the retaining or housing rings 22 are of cast iron, although it is obvious that any desired material may be used. The rim 19 is grooved internally at each side to form half of the support for the outer faces of the adjacent pneumatic tires, and between the said tires extends inwardly as shown at 34, but does not extend into contact with the rim of the inner wheel. Thus the tread member of the wheel consists of but three pieces, exclusive of the rubber tire, namely, the rim portion 19, and the retaining or housing rings.

The inner wheel sections consist of the hub section 1, the rim section 2, and the spokes 3, and each section is also cast from a special aluminum alloy. The sections are symmetrical, and each section provides a support for one pneumatic tire. The arms 27 are driving members to constrain the tread member or rim proper to rotate with the inner wheel, and the said arms are preferably of forged steel. The arms are spaced at equal angular intervals.

By providing three driving arms, the inner wheel is protected from shock in case a tire should prove defective and relieve the wheel of its natural cushion. For instance, should the pressure be absent in one of the tires, the outer wheel would be spaced from the inner wheel by the driving arms, which would carry the load, transmitting the load to the outer wheel or tread. The pneumatic tires are thus positively protected on every side from injury. The tread member consisting of the rim 19 and the retaining or housing rings 22 protect the tires against injury from the road, while the rims 2 protect them from internal injury. The packings 26 protect the tires from the entrance of dust and dirt. Since the wheel is principally of aluminum alloy, it is of light weight.

It will be noticed from an inspection of Fig. 3 that the rim 19 is provided with laterally extending bosses or projections 35 on its side faces, for engaging openings 36 in the inner faces of the rims 25 of the retaining rings 22. The said projections and recesses assist the bolts 23 in holding the retaining or housing rings to the rim; the solid tire 21 is, as before stated, seated in the groove 20 in the rim 19, and the said rim is provided at each side of the groove with a radial flange 37, the said flanges fitting alongside the opposite sides of the solid tire 21, and bolts 38 are passed through the flanges and the tire and are engaged by nuts 39 to hold the tire in the groove. The said tire extends beyond the flanges a sufficient distance to prevent contact of the said flanges with the road.

In operation, when the wheel is in use, the inner wheel may move radially with respect to the outer wheel to compensate for shock, but the outer wheel or tread member is constrained to rotate with the inner wheel by the driving arms 27, before mentioned.

The pneumatic tires are perfectly protected from injury in any direction, and may thus impart to the wheel all of their resiliency without being subjected to any large amount of wear.

I claim:—

A wheel of the character specified, comprising an inner wheel having external annular grooves for receiving pneumatic tires, and an external tread member having internal grooves registering with the grooves of the wheel for engaging the tires, said inner wheel being divided into sections between the grooves, and the tread member being divided at the center of each groove into a central ring and lateral rings, means for clamping the sections of the wheel together, and means for clamping the rings together, and a series of driving arms connecting the wheel with the tread member, each arm being arranged between the sections of the wheel and rigidly secured to the hub, the central ring having radial recesses for receiving the outer ends of the arms, and a pin and slot connection between the said ring and one of the arms.

JOS. LAUS, Jr.

Witnesses:
 JULIUS H. BEUTLER,
 J. CHESTER THOMAS.